(12) United States Patent
Lim et al.

(10) Patent No.: US 9,984,823 B2
(45) Date of Patent: May 29, 2018

(54) CAPACITOR ELEMENT AND METHOD OF MANUFACTURING THE SAME

(71) Applicant: SAMSUNG ELECTRO-MECHANICS CO., LTD., Suwon-Si, Gyeonggi-Do (KR)

(72) Inventors: Jong Bong Lim, Suwon-Si (KR); Hai Joon Lee, Suwon-Si (KR); Doo Young Kim, Suwon-Si (KR); Chang Hoon Kim, Suwon-Si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 52 days.

(21) Appl. No.: 14/742,355

(22) Filed: Jun. 17, 2015

(65) Prior Publication Data

US 2015/0380167 A1 Dec. 31, 2015

(30) Foreign Application Priority Data

Jun. 25, 2014 (KR) ........................ 10-2014-0078367

(51) Int. Cl.
| | | |
|---|---|---|
| *H01G 4/30* | (2006.01) | |
| *H01G 4/012* | (2006.01) | |
| *H01G 4/12* | (2006.01) | |
| *H01G 4/232* | (2006.01) | |

(52) U.S. Cl.
CPC ............... *H01G 4/30* (2013.01); *H01G 4/012* (2013.01); *H01G 4/12* (2013.01); *H01G 4/232* (2013.01); *H01G 4/2325* (2013.01)

(58) Field of Classification Search
CPC ............ H01G 4/30; H01G 4/33; H01G 4/008; H01G 4/005; H01G 4/06; H01G 4/306; H01G 4/12
See application file for complete search history.

(56) References Cited

U.S. PATENT DOCUMENTS

| 6,475,317 B1 | 11/2002 | Baba et al. |
| 7,326,858 B2 † | 2/2008 | Lee |
| 7,778,010 B2 † | 8/2010 | Sato |

(Continued)

FOREIGN PATENT DOCUMENTS

| CN | 1264905 A | 8/2000 |
| CN | 1832070 A | 9/2006 |

(Continued)

OTHER PUBLICATIONS

Korean Office Action issued in Korean Application No. 10-2014-0078367, dated Jan. 6, 2015, with English Translation.

(Continued)

*Primary Examiner* — Nguyen Ha
(74) *Attorney, Agent, or Firm* — McDermott Will & Emery LLP

(57) ABSTRACT

Disclosed herein is a thin film type capacitor element, including: a body part formed by stacking a plurality of dielectric layers; a first internal electrode provided in the body part and including a first non-plated region; a second internal electrode including a second non-plated region; a first via formed in the first non-plated region; and a second via formed in the second non-plated region.

22 Claims, 7 Drawing Sheets

(56) References Cited

U.S. PATENT DOCUMENTS

| | | | |
|---|---|---|---|
| 2006/0067029 A1* | 3/2006 | Kuniyasu | H01G 4/232 361/302 |
| 2006/0198079 A1 | 9/2006 | Shim et al. | |
| 2009/0231820 A1 | 9/2009 | Tanaka | |
| 2009/0296310 A1* | 12/2009 | Chikara | H01G 2/065 361/301.4 |
| 2010/0246092 A1 | 9/2010 | Shibue et al. | |
| 2011/0037536 A1 | 2/2011 | Kanno et al. | |
| 2011/0134582 A1 | 6/2011 | Kanno | |
| 2012/0326272 A1* | 12/2012 | Rokuhara | H01G 4/33 257/532 |
| 2013/0120902 A1* | 5/2013 | Noguchi | H01G 4/12 361/303 |
| 2013/0329339 A1* | 12/2013 | Masuda | H01G 4/06 361/311 |
| 2014/0328004 A1* | 11/2014 | Specht | A61N 1/3754 361/301.4 |

FOREIGN PATENT DOCUMENTS

| | | | |
|---|---|---|---|
| CN | 101996765 A | | 3/2011 |
| JP | 10-270282 A | | 10/1998 |
| JP | H10-270282 | † | 10/1998 |
| JP | 2006-222440 A | | 8/2006 |
| KR | 10-2001-0026505 A | | 4/2001 |
| KR | 2002-0066135 A | | 8/2002 |
| KR | 10-2009-0042850 A | | 4/2009 |

OTHER PUBLICATIONS

Non-Final Office Action dated in 15/450,568, dated Sep. 8, 2017.

Office Action issued in corresponding Chinese Patent Application No. 201510357899.7, dated Sep. 27, 2017 with English Translation.

Notice of Allowance issued in related U.S. Appl. No. 15/450,568, dated Jan. 25, 2018.

Chinese Office Action issued in corresponding Chinese Patent Application No. 201510357899.7, dated Apr. 4, 2018, with English Translation.

Non-Final Office Action issued in related U.S. Appl. No. 15/450,568, dated Apr. 3, 2018.

\* cited by examiner
† cited by third party

CAPACITOR ELEMENT AND METHOD OF MANUFACTURING THE SAME

This application claims the benefit under 35 U.S.C. Section [120, 119, 119(e)] of Korean Patent Application Serial No. 10-2014-0078367 entitled "Thin Film Type Capacitor Element and Method of Manufacturing the Same" filed on Jun. 25, 2014, which is hereby incorporated by reference in its entirety into this application.

BACKGROUND OF THE INVENTION

1. Technical Field

The present disclosure relates to an electronic component, and more particularly, to a thin film type capacitor element and a method of manufacturing the same.

2. Description of the Related Art

Generally, electronic components using a ceramic material, such as a capacitor element, an inductor element, a piezoelectric element, a varistor, a thermistor, or the like, include a body formed of the ceramic material, internal electrodes formed in the body, and external terminals installed on a surface of the ceramic body so as to be connected to the internal electrodes.

Among these, the capacitor element has a structure in which the internal electrode having positive (+) polarity and the internal electrode having negative (−) polarity are disposed to be opposite to each other while having at least one dielectric layer therebetween, and an end portion of the internal electrode is exposed to the outside of the body so as to be connected to the external terminal.

The capacitor element has been widely used as a component of mobile communication devices such as computers, PDAs, cellular phones, and the like. As an electronic product recently implements high performance, the capacitor element has been required to be miniaturized and to have mass capacity.

To this end, a manufacturing method in which the dielectric layer and the internal electrode are deposited by using a thin film process of a semiconductor has been proposed. Here, after a metal material for forming the internal electrode is deposited, a patterning process is performed through a photolithography process and an etching process. In this case, as the number of stacked metal layers is increased, the number of times of the patterning process is also increased, which results in a complex manufacturing process.

SUMMARY OF THE INVENTION

An object of the present disclosure is to provide a thin film type capacitor element that does not delay a process even in the case in which the number of stacked internal electrodes is increased by forming the internal electrodes without a patterning process and connects the internal electrodes on the respective layers to each other by forming a non-plated region by allowing some regions of the internal electrode not to be plated upon forming the internal electrodes and by forming a via in the non-plated region, and a method of manufacturing the same.

According to an exemplary embodiment of the present disclosure, there is provided a thin film type capacitor element including: a first internal electrode and a second internal electrode each having a non-plated region.

The first internal electrode and the second internal electrode may be alternately stacked while having at least one dielectric layer therebetween, so as to form a body part together with the dielectric layer, wherein the first internal electrodes may be electrically connected to each other by a via which is formed in the non-plated region of the second internal electrode and penetrates through the body part in a vertical direction. The second internal electrodes may be electrically connected to each other by a via which is formed in the non-plated region of the first internal electrode and penetrates through the body part in a vertical direction.

According to another exemplary embodiment of the present disclosure, there is provided a method of manufacturing a thin film type capacitor element, wherein a dielectric layer and an internal electrode are formed by alternately stacking a dielectric material and a metal material by a thin film process, and in the case of the internal electrode, a mask having a predetermined pattern is disposed on the dielectric layer and a deposition process is then performed. If a body part is formed through the above-mentioned process, a via hole is machined in a position at which a via is to be formed, and an inner portion of the via hole is plated and filled, whereby a finally finished thin film type capacitor element may be provided.

BRIEF DESCRIPTION OF THE DRAWINGS

FIG. 3 is a view illustrating only first and second internal electrodes included in the present disclosure.

FIG. 12 is a view for describing a mask used upon manufacturing the present disclosure.

DESCRIPTION OF THE PREFERRED EMBODIMENTS

Figure 1:
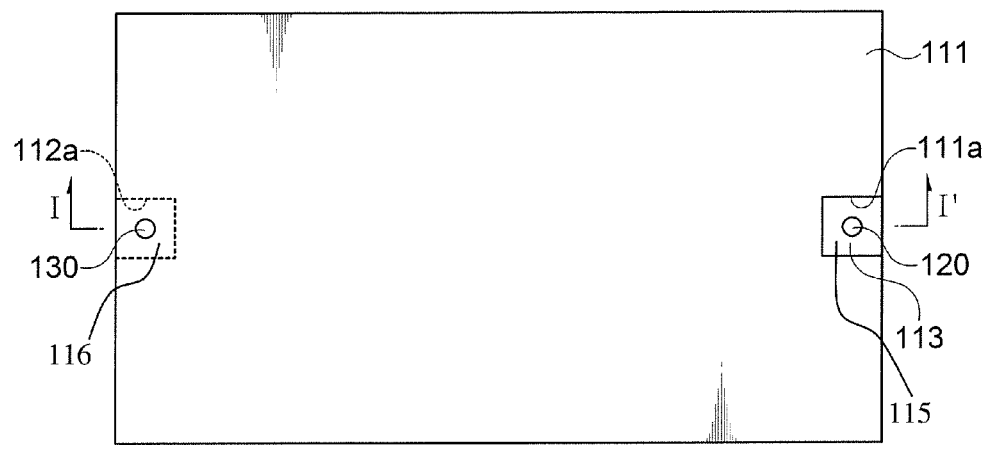
FIG. 1 is a plan view of a thin film type capacitor element according to the present disclosure.

Various advantages and features of the present disclosure and methods accomplishing thereof will become apparent from the following description of exemplary embodiments with reference to the accompanying drawings. However, the present disclosure may be modified in many different forms and it should not be limited to exemplary embodiments set forth herein. These exemplary embodiments may be provided so that this disclosure will be thorough and complete, and will fully convey the scope of the disclosure to those skilled in the art. Like reference numerals throughout the description denote like elements.

Terms used in the present specification are for explaining exemplary embodiments rather than limiting the present disclosure. Unless explicitly described to the contrary, a singular form includes a plural form in the present specification. The word 'comprise' and 'comprising' used in the present specification will be understood to imply the inclusion of stated components, steps, operations and elements but not the exclusion of any other components, steps, operations and elements.

Hereinafter, a configuration and an acting effect of exemplary embodiments of the present disclosure will be described in more detail with reference to the accompanying drawings.

Figure 2:
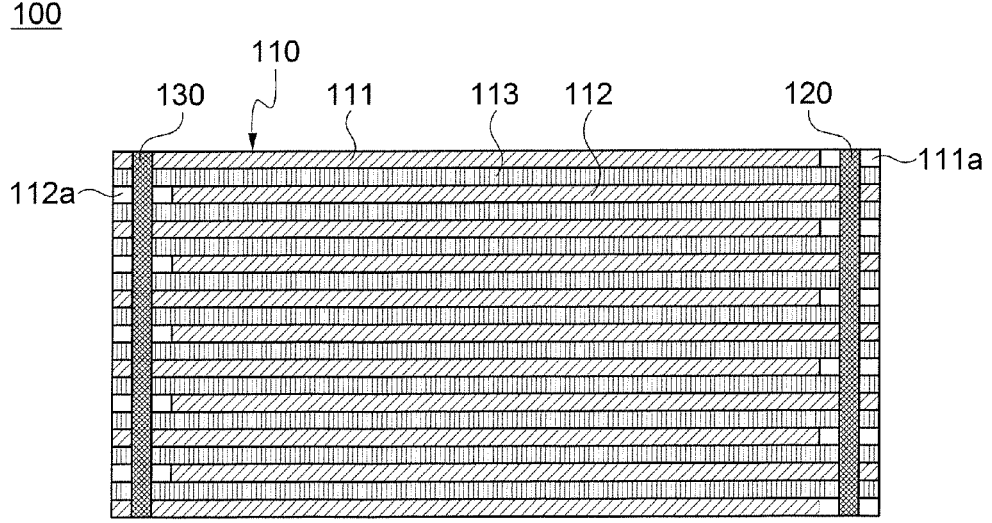
FIG. 2 is a cross-sectional view taken along line I-I' of FIG. 1.
Figure 3A:
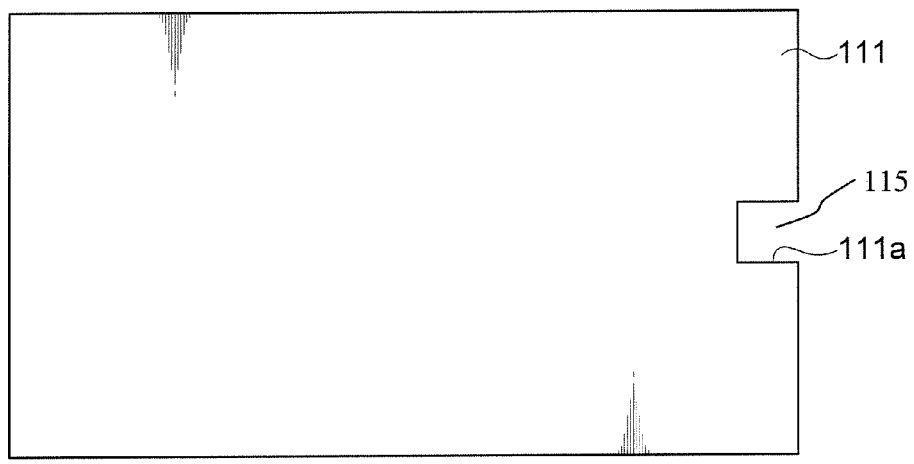
FIG. 3A is a plan view of the first internal electrode.
Figure 3B:
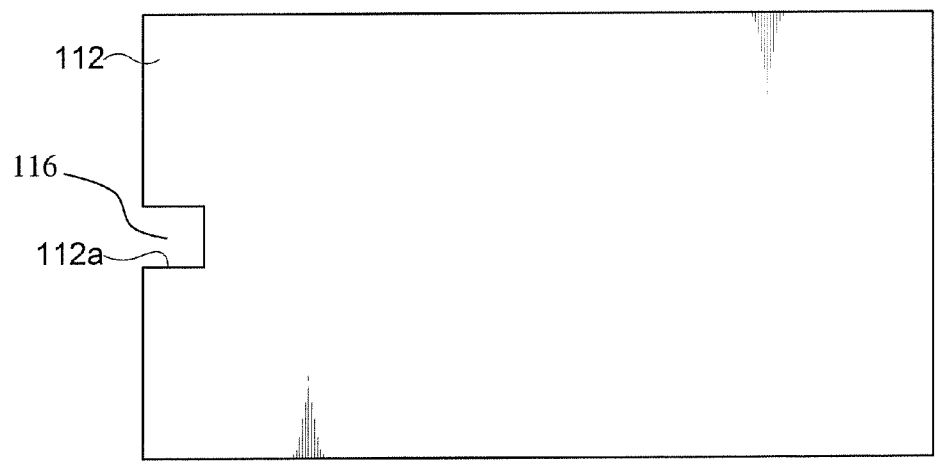
FIG. 3B is a plan view of the second internal electrode.

FIG. 1 is a plan view of a thin film type capacitor element according to the present disclosure, FIG. 2 is a cross-sectional view taken along line I-I' of FIG. 1, FIG. 3 is a view illustrating only first and second internal electrodes included in the present disclosure, FIG. 3A is a plan view of the first internal electrode, and FIG. 3B is a plan view of the second internal electrode.

For reference, components shown in the accompanying drawings are not necessarily shown to scale. For example, sizes of some components shown in the accompanying drawings may be exaggerated as compared with other components in order to assist in the understanding of the exemplary embodiments of the present disclosure.

Referring to FIGS. 1 to 3, a thin film type capacitor 100 according to the present disclosure includes a body part 110, a first internal electrode 111 and a second internal electrode that are provided in the body part 110, and a first via 120 and a second via 130 that penetrate through the body part 110.

The body part 110 is formed by stacking a plurality of dielectric layers and then going through pressing and sintering processes the plurality of stacked dielectric layers under a predetermined condition, wherein adjacent dielectric layers 113 are integrated so as not to confirm a boundary therebetween.

Examples of a material of the dielectric layer 113 may include a perovskite structure having high dielectric constant or an oxide material having a Bi based layered structure, for example, barium titanate ($BaTiO_3$) based or strontium titanate ($SrTiO_3$) based material.

The first internal electrode 111 and the second internal electrode 112 are alternately disposed while having at least one dielectric layer 113 therebetween, wherein the first internal electrode 111 includes a first non-plated region 111a and the second internal electrode 112 includes a second non-plated region 112a.

The first and second internal electrodes 111 and 112, which are metal thin films having a cross section of an approximate rectangular shape, are formed by depositing a metal material, for example, nickel (Ni), aluminum (Al), copper (Cu), gold (Au), silver (Ag), or the like on an upper portion of the dielectric layer 113. In this case, the metal is not deposited on some regions, such that the first non-plated region 111a and the second non-plated region 112a are formed.

The first and second non-plated regions 111a and 112a are each disposed at edges of the first internal electrode 111 and the second internal electrode 112. Consequently, the first and second internal electrodes 111 and 112 are formed as the metal thin films of the rectangular shape having first and second grooves 115 and 116 formed in the edges thereof, respectively.

The first via 120 is formed in the first non-plated region 111a and the second via 130 is formed in the second non-plated region 112a. The first and second vias 120 and 130 penetrate through the body part 110. Specifically, the first via 120 penetrates through the second internal electrode 112 and the dielectric layer 113 and the second via 130 penetrates through the first internal electrode 111 and the dielectric layer 113.

By the structure as described above, the first internal electrodes 111 of the respective layers are electrically connected to each other through the second via 130 and the second internal electrodes 112 of the respective layers are electrically connected to each other through the first via 120.

In order to prevent a short circuit between the first via 120 and the second via 130, the first non-plated region 111a and the second non-plated region 112a are disposed at positions that are spaced apart from each other and are not overlapped with each other when being viewed from the top.

Figure 4:
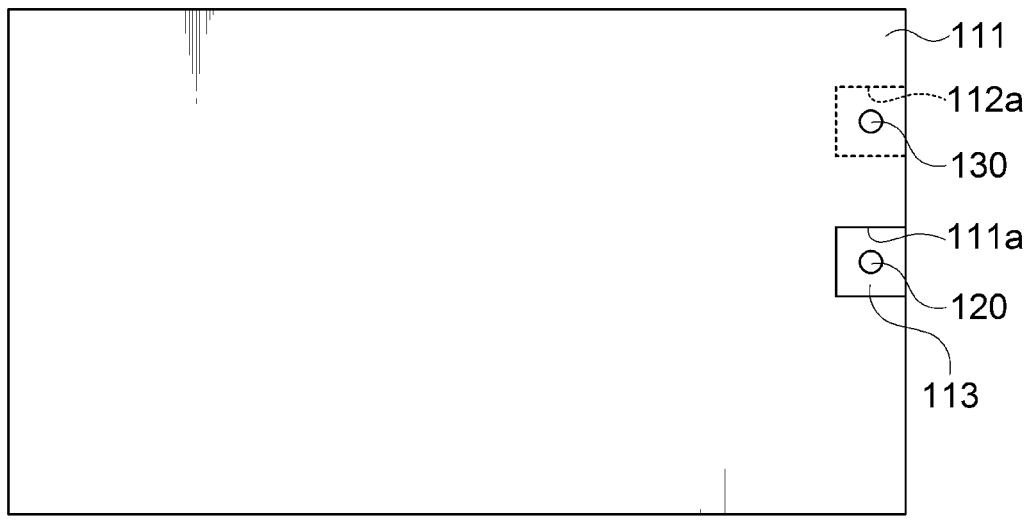
FIGS. 4 to 7 are views for describing examples according to positions and shapes of first and second non-plated regions included in the present disclosure.
Figure 5:
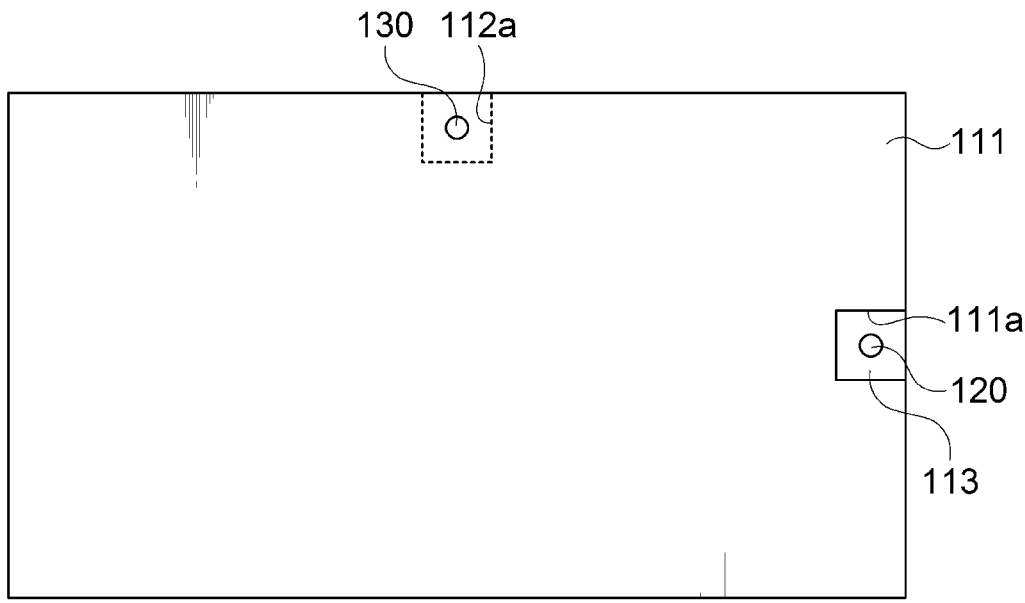

FIGS. 4 to 7 are views illustrating various examples according to positions and shapes of the first and second non-plated regions 111a and 112a, wherein the first non-plated region 111a and the second non-plated region 112a may be formed at any position as long as they are not overlapped with each other. For example, the first non-plated region 111a and the second non-plated region 112a may be formed at the edge in the same direction as illustrated in FIG. 4 or may be each formed two edges that are adjacent to each other such as an edge of a short side and an edge of a long side as illustrated in FIG. 5.

Figure 6:
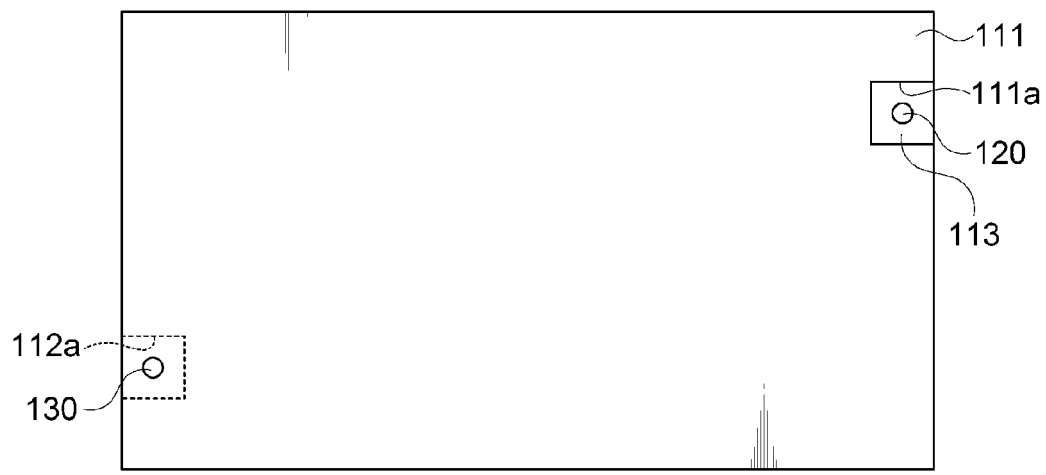

However, for convenience of the manufacturing, the first non-plated region 111a and the second non-plated region 112a are advantageously formed at edges that are opposite to each other, and particularly, may be formed at positions that are symmetrical with each other in a horizontal direction (or a vertical direction) as illustrated in FIG. 1 or symmetrical with each other in a diagonal direction as illustrated in FIG. 6. An effect according the above-mentioned structure will be described in detail in a method of manufacturing a thin film type capacitor element to be described below.

It is advantageous in view of capacitance that an area of the first non-plated region 111a has a minimum value within a range in which the first via 120 is not in contact with the first internal electrode 111, that is, within a range in which the area of the first non-plated region 111a is larger than a horizontal cross-section area of the first via 120. The reason is that as the area of the first non-plated region 111a is increased, an area of the first internal electrode 111 is reduced, thereby reducing capacitance. Similarly, an area of the second non-plated region 112a has a minimum value within a range in which the area of the second non-plated region 112a is larger than a horizontal cross-section area of the second via 130.

Figure 7:
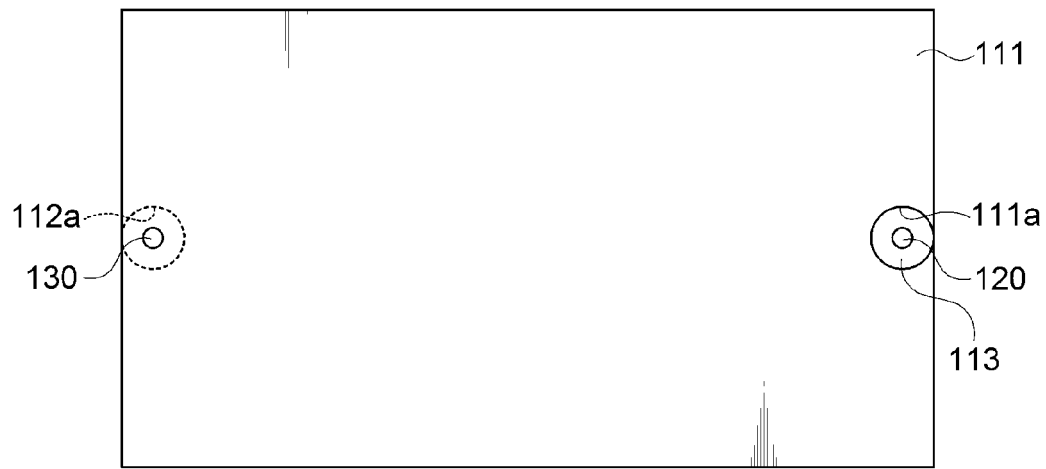

In addition, the first and second non-plated regions 111a and 112a may be formed in any shape within a range in which the first and second non-plated regions 111a and 112a are not in contact with the first via 120 and the second via 130, respectively. For example, the first and second non-plated regions 111a and 112a may be formed in a circular shape as illustrated in FIG. 7 as well as a quadrangular shape as illustrated in FIG. 1. In addition to this, the first and second non-plated regions 111a and 112a may also be formed in various shapes such as a triangular shape, trapezoidal shape, and the like.

However, also in this case, for convenience for the manufacturing, the first and second non-plated regions 111a and 112a are preferably formed in the same shape as each other.

Hereinafter, a method of manufacturing a thin film type capacitor element according to the present disclosure will be described.

Figure 8:
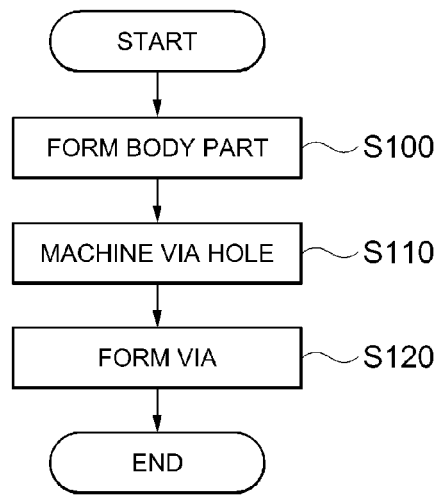
FIG. 8 is a flowchart sequentially illustrating a method of manufacturing a thin film type capacitor element according to the present disclosure.
Figure 9:
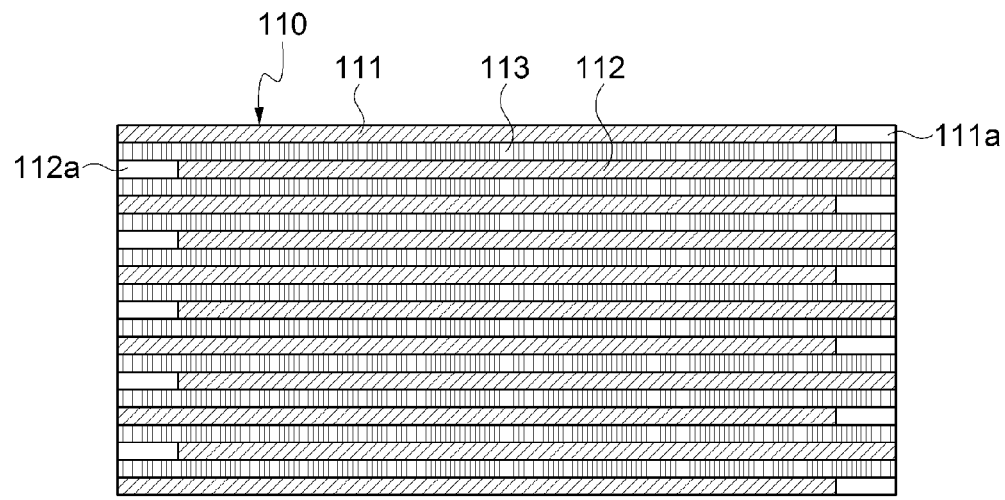
FIGS. 9 to 11 are cross-sectional views illustrating the respective processes.
Figure 10:
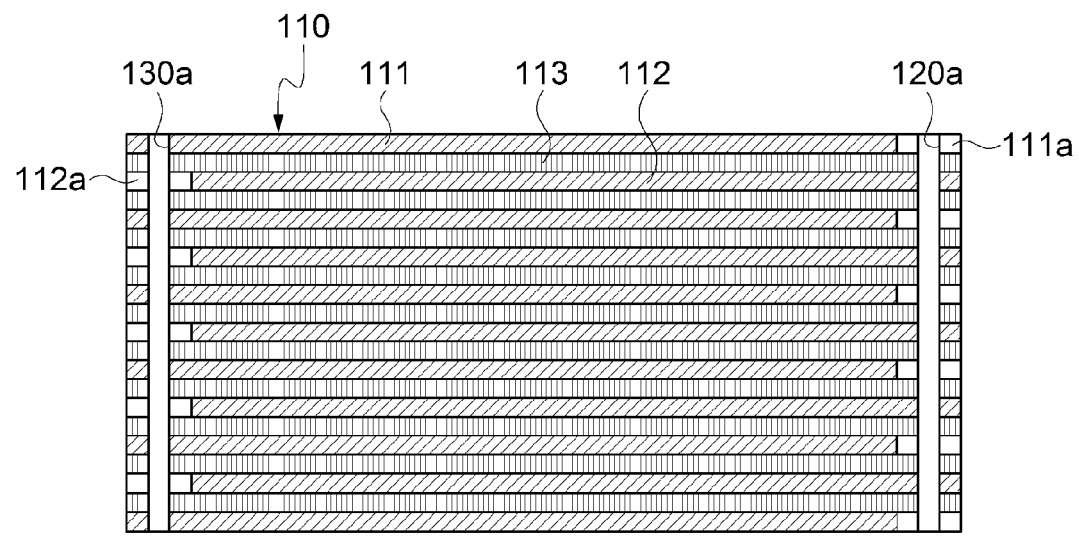
Figure 11:
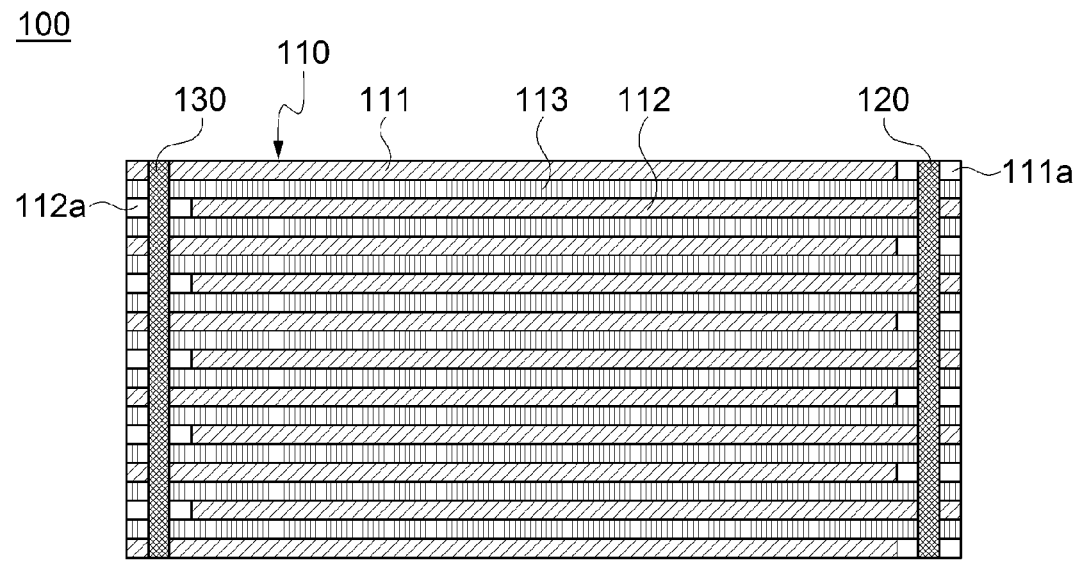

FIG. 8 is a flowchart sequentially illustrating a method of manufacturing a thin film type capacitor element according to the present disclosure, and FIGS. 9 to 11 are cross-sectional views illustrating the respective processes.

Referring to FIGS. 8 to 11, in the method of manufacturing the thin film type capacitor element according to the present disclosure, first, a body part 110 is formed (S100).

The body part 110 is formed by alternately depositing a dielectric material, which is a structure material of a dielectric layer 113 and a metal material, which is a structure material of first and second internal electrodes 111 and 112, using a thin film process such as a sputter process, an ALD process, a CVD process, or the like (FIG. 9).

Here, when the metal material for forming the first and second internal electrodes 111 and 112 is deposited, a mask having a predetermined pattern is disposed on the dielectric layer 113 and a deposition process is then performed.

Figure 12A:
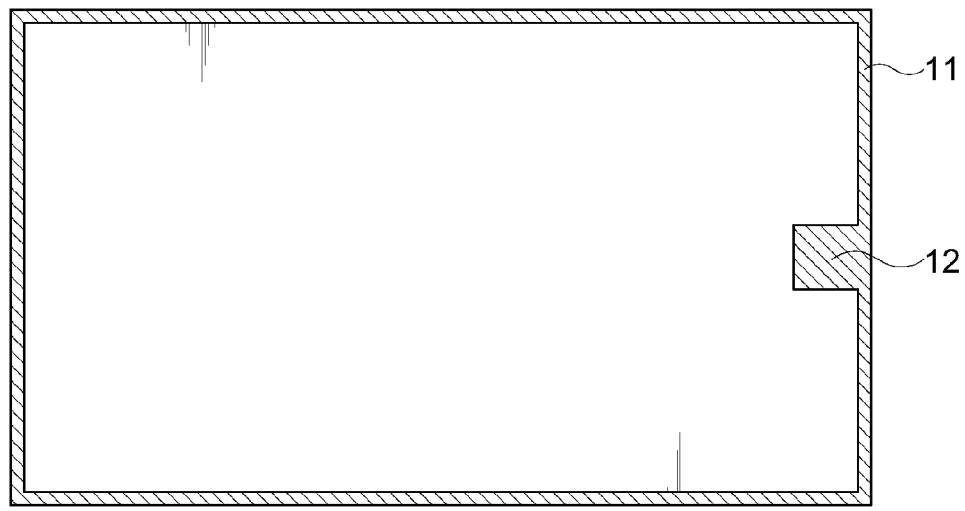
FIG. 12A is a plan view of a first mask.
Figure 12B:
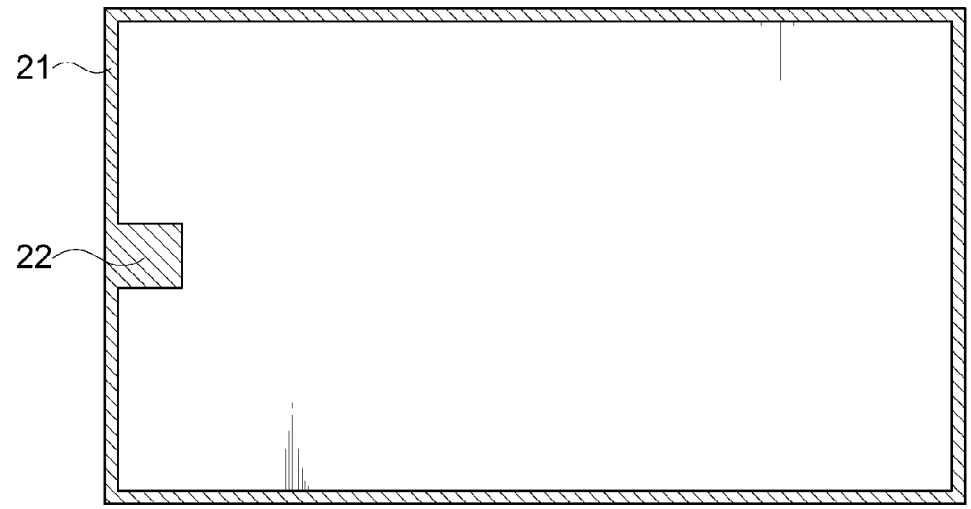
FIG. 12B is a plan view of a second mask.

FIG. 12 is a view for describing a mask used upon manufacturing the present disclosure, FIG. 12A is a plan view of a first mask, and FIG. 12B is a plan view of a second mask.

Referring to FIG. 12, the mask is divided into a first mask 10 used upon performing a deposition process of the first internal electrode 111 and a second mask 20 used upon performing a deposition process of the second internal electrode 112, wherein the first and second masks 10 and 20 each include frame parts 11 and 21 and plating prevention parts 12 and 22. Here, the plating prevention parts 12 and 22 are not separated from the frame parts 11 and 21 and are coupled to predetermined positions of the frame parts 11 and 21 in a protruded shape.

The plating prevention part 12 of the first mask 10 and the plating prevention part 22 of the second mask 20 are disposed at positions which are not overlapped with each other. More preferably, the plating prevention part 12 of the first mask 10 and the plating prevention part 22 of the second mask 20 may be disposed at positions which are symmetrical with each other in a horizontal direction (or a vertical direction) or are symmetrical with each other in a diagonal direction.

The plating prevention parts 12 and 22 are each formed in shapes corresponding to the first and second non-plated regions 111a and 112a, and the metal material is not deposited on portions which are covered by the plating prevention parts 12 and 22. Therefore, the first non-plated region 111a is formed in a position where the plating prevention part 12 of the first mask 10 was present, and the second non-plated region 112a is formed in a position where the plating prevention part 22 of the second mask 20 was present.

Here, in the case in which the plating prevention part 12 of the first mask 10 and the plating prevention part 22 of the second mask 20 are symmetrical with each other in the horizontal direction, for example, if the deposition process of the first internal electrode 111 is finished, the first mask 10 used in the deposition process of the first internal electrode 111 may be turned so as to be used in a deposition process of the second internal electrode 112. That is, since the first internal electrode 111 and the second internal electrode 112 may be formed by one mask, manufacturing costs may be reduced.

Meanwhile, in the case in which the plating prevention part 12 of the first mask 10 and the plating prevention part 22 of the second mask 20 are symmetrical with each other in the diagonal direction, if the deposition process of the first internal electrode 111 is finished, the first mask 10 used in the deposition process of the first internal electrode 111 may be rotated at an angle of 180° so as to be used in the deposition process of the second internal electrode 112. In this case, since the turned first mask 10 is not reused, it is possible to prevent foreign materials from remaining on the dielectric layer 113.

If the body part 110 is finished, a first via hole 120a that penetrates through the body part 110 in a vertical direction is formed in the first non-plated region 111a and a second via hole 130a that penetrates through the body part 110 in the vertical direction is formed in the second non-plated region 112a (S120).

When machining the first and second via holes 120a and 130a, the first and second via holes 120a and 130a are each machined so as not to deviate from the first non-plated region 111a and the second non-plated region 112a. Consequently, the first via hole 120a penetrates through the second internal electrode 112 and the dielectric layer 113, and the second via hole 130a penetrates through the first internal electrode 111 and the dielectric layer 113 (FIG. 10).

Therefore, if an inner portion of the first via hole 120a is plated and filled, a first via 120 that electrically connects the second internal electrodes 112 to each other is formed, and if an inner portion of the second via hole 130a is plated and filled, a second via 120 that electrically connects the first internal electrodes 111 to each other is formed, whereby the thin film type capacitor element according to the present disclosure may be finished (FIG. 11).

According to the exemplary embodiment of the present disclosure, since a separate patterning process is not performed after the metal material for forming the internal electrodes is deposited, the product may be finished as soon as possible without increasing costs for manufacturing the product even though the number of stacked internal electrode is increased in order to implement mass capacity.

In addition, the non-plated region is formed by allowing the some regions of the internal electrode not to be plated upon depositing the metal material for forming the internal electrodes and the respective layers of the internal electrodes are connected by forming the via in the non-plated region, whereby a structure may be simplified.

The present disclosure has been described in connection with what is presently considered to be practical exemplary embodiments. Although the exemplary embodiments of the present disclosure have been described, the present disclosure may also be used in various other combinations, modifications and environments. In other words, the present disclosure may be changed or modified within the range of concept of the disclosure disclosed in the specification, the range equivalent to the disclosure and/or the range of the technology or knowledge in the field to which the present disclosure pertains. The exemplary embodiments described above have been provided to explain the best state in carrying out the present disclosure. Therefore, they may be carried out in other states known to the field to which the present disclosure pertains in using other disclosures such as the present disclosure and also be modified in various forms required in specific application fields and usages of the disclosure. Therefore, it is to be understood that the disclosure is not limited to the disclosed exemplary embodiments. It is to be understood that other exemplary embodiments are also included within the spirit and scope of the appended claims.

What is claimed is:

1. A capacitor device comprising:
a body part including a first via, a second via, and dielectric layers laminated therein; and
a plurality of first internal electrode layers disposed on the dielectric layers and connected to each other by the second via; and
a plurality of second internal electrode layers disposed on the dielectric layers and connected to each other by the first via,
wherein one end portion of the first via and one end portion of the second via are located in the same layer in a lamination direction, and the other end portion of the first via and the other end portion of the second via are located in the same layer, each of the plurality of first internal electrode layers has a first groove through which the first via penetrates, entirety of inside walls of each first groove being spaced apart from the first via, and each of the plurality of second internal electrode layers has a second groove through which the second via penetrates, entirety of inside walls of each second groove being spaced apart from the second via.

2. The capacitor device of claim 1, wherein the first and second vias penetrate through the body part.

3. The capacitor device of claim 1, wherein the first groove and the second groove do not overlap each other.

4. The capacitor device of claim 1, wherein the first groove is a recess from an edge of a respective first internal electrode layer.

5. The capacitor device of claim 1, wherein the second groove is a recess from an edge of a respective second internal electrode layer.

6. The capacitor device of claim 1, wherein the first groove and the second groove are disposed to oppose each other.

7. The capacitor device of claim 6, wherein the first groove and the second groove are symmetrical to each other in a horizontal direction or in a vertical direction.

8. The capacitor device of claim 6, wherein the first groove and the second groove are symmetrical to each other in a diagonal direction.

9. The capacitor device of claim 1, wherein the first groove and the second groove have at least one of a quadrangular shape, a triangular shape, and a circular shape.

10. The capacitor device of claim 1, wherein an area of the first groove has a minimum value within a range greater than a horizontal cross-sectional area of the first via, and an area of the second groove has a minimum value within a range greater than a horizontal cross-sectional area of the second via.

11. The capacitor device of claim 1, wherein the first groove and the second groove have the same shape.

12. The capacitor device of claim 1, wherein the first via penetrates through the plurality of second internal electrode layers and is in direct contact with the plurality of second internal electrode layers.

13. The capacitor device of claim 1, wherein the second via penetrates through the plurality of first internal electrode layers and is in direct contact with the plurality of first internal electrode layers.

14. A capacitor device comprising:

a body part including first and second vias and dielectric layers laminated therein;

a plurality of first internal electrode layers disposed on the dielectric layers and connected to each other by the second via; and a plurality of second internal electrode layers disposed on the dielectric layers and connected to each other by the first via, wherein the first via and the second via penetrate through the body part, each of the plurality of first internal electrode layers has a first groove through which the first via penetrates, entirety of inside walls of each first groove being spaced apart from the first via, and each of the plurality of second internal electrode layers has a second groove through which the second via penetrates, entirety of inside walls of each second groove being spaced apart from the second via.

15. The capacitor device of claim 14, wherein the first via penetrates through the plurality of second internal electrode layers and is in direct contact with the plurality of second internal electrode layers.

16. The capacitor device of claim 14, wherein the second via penetrates through the plurality of first internal electrode layers and is in direct contact with the plurality of first internal electrode layers.

17. A method of manufacturing a capacitor device, comprising:

forming a body part by alternately laminating a first internal electrode layer including a first groove and a second internal electrode layer including a second groove to have a dielectric layer between the first internal electrode layer and the second internal electrode layer;

forming a first via hole penetrating through the dielectric layer and the second internal electrode layer in a lamination direction in the first groove, and a second via hole penetrating through the dielectric layer and the first internal electrode layer in the lamination direction in the second groove; and forming a first via by filling an interior of the first via hole with a plating material and forming a second via by filling an interior of the second via hole with a plating material, and wherein, in the forming of the first internal electrode layer, a first mask configured of an edge portion and a plating prevention portion having a shape corresponding to a shape of the first groove is disposed on the dielectric layer, and a metal material is then deposited using a thin film process, and in the forming of the second internal electrode layer, a second mask configured of an edge portion and a plating prevention portion having a shape corresponding to a shape of the second groove is disposed on the dielectric layer, and a metal material is then deposited using a thin film process.

18. The method of claim 17, wherein one end portion of the first via and one end portion of the second via are formed to be located in the same layer in a lamination direction, and the other end portion of the first via and the other end portion of the second via are formed to be located in the same layer.

19. The method of claim 17, wherein the first and second vias penetrate through the body part.

20. The method of claim 17, wherein the plating prevention portion of the first mask and the plating prevention portion of the second mask are positioned to oppose each other.

21. The method of claim 20, wherein the plating prevention portion of the first mask and the plating prevention portion of the second mask are symmetrical to each other in a horizontal direction or in a vertical direction.

22. The method of claim 20, wherein the plating prevention portion of the first mask and the plating prevention portion of the second mask are symmetrical to each other in a diagonal direction.

* * * * *